United States Patent [19]

Grider

[11] Patent Number: 5,048,181
[45] Date of Patent: Sep. 17, 1991

[54] METHOD FOR MAKING THICK FILM CIRCUIT HOUSING ASSEMBLY DESIGN

[75] Inventor: Duane M. Grider, Eagan, Minn.

[73] Assignee: Ford Motor Company, Dearborn, Mich.

[21] Appl. No.: 615,526

[22] Filed: Nov. 19, 1990

Related U.S. Application Data

[62] Division of Ser. No. 245,496, Sep. 19, 1988.

[51] Int. Cl.⁵ .............................................. H05K 3/39
[52] U.S. Cl. ..................................... 29/840; 29/592.1; 338/42
[58] Field of Search ........................... 29/621.1, 592.1; 338/42

[56] References Cited

U.S. PATENT DOCUMENTS

| | | | |
|---|---|---|---|
| 3,899,766 | 8/1975 | Mermelstein | 338/42 |
| 3,935,632 | 2/1976 | Mermelstein | 29/592.1 X |
| 4,021,766 | 5/1977 | Aine | 29/592.1 X |
| 4,371,762 | 2/1983 | Diamond | 338/42 X |
| 4,656,454 | 4/1987 | Rosenberger | 29/621.1 X |
| 4,850,227 | 7/1989 | Luettgen et al. | 29/621.1 X |
| 4,994,781 | 2/1991 | Sahagen | 338/42 X |

Primary Examiner—Carl J. Arbes
Attorney, Agent, or Firm—Peter Abolins; Keith L. Zerschling

[57] ABSTRACT

A housing and a pressure seal structure for use with a thick film circuit having a pressure sensor and terminals includes a base plate below the thick film circuit, a top housing above the thick film circuit covering the pressure sensor and an intermediate rubber ring between the housing and the thick film circuit. A coupling force is applied between the base plate and the top housing to draw the two together and apply a sealing force to the rubber ring and establish a pressure seal at the rubber ring.

6 Claims, 4 Drawing Sheets

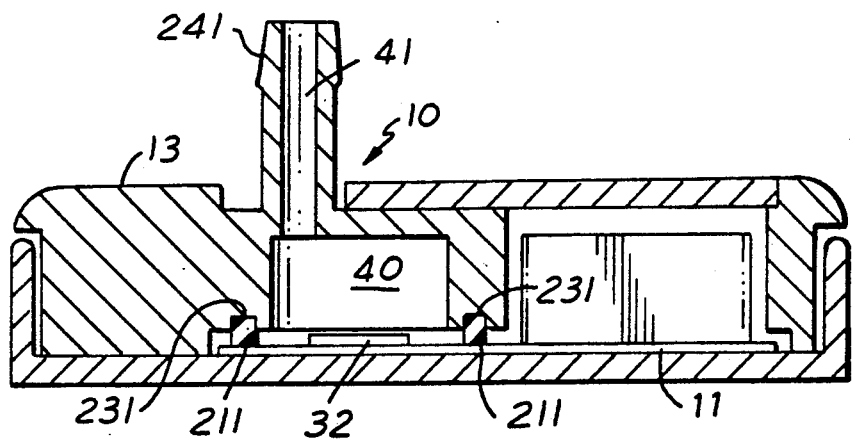
FIG. 7
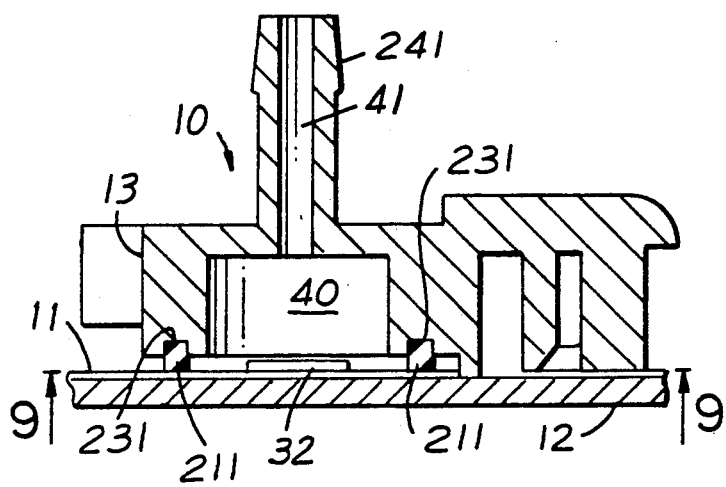
FIG. 8
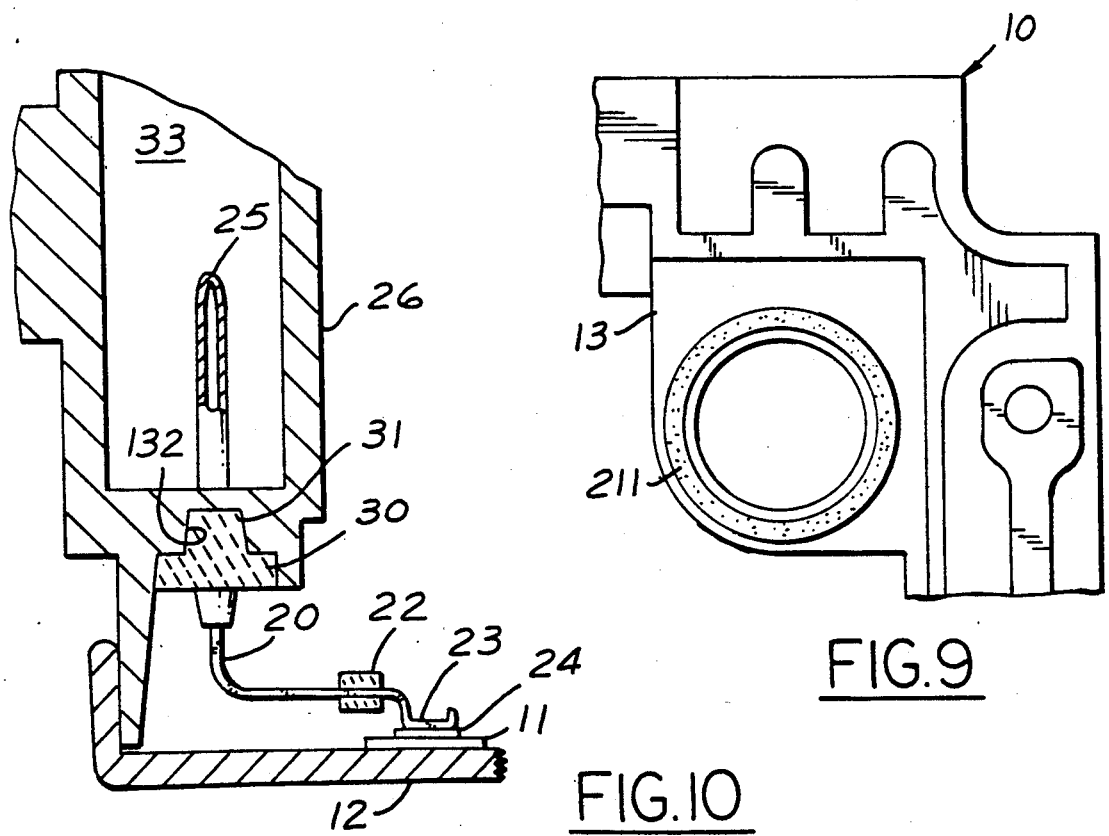
FIG. 9
FIG. 10

5,048,181

METHOD FOR MAKING THICK FILM CIRCUIT HOUSING ASSEMBLY DESIGN

This is a Division of application Ser. No. 07/245,496, filed Sept. 19, 1988.

FIELD OF THE INVENTION

This invention relates to thick film circuit assemblies.

BACKGROUND OF THE INVENTION

Thick film circuit assemblies may include numerous components which must be accurately positioned with respect to a thick film circuit board during manufacture. Manufacture may also require several separate sequential assembly actions that require intermediate repositioning of one or more pieces of the assembly. Each such assembly step requires time and allows for an error in assembly. It would be desirable to have a thick film circuit housing assembly design which facilitated proper alignment and assembly.

Thick film circuit boards may contain components, such as a pressure sensor, which require a housing to isolate the pressure to be measured from the ambient pressure. Such housings typically have had numerous structural components and seals to provide the desired pressure isolation.

Referring to prior art FIGS. 1 and 2, a housing assembly 110 includes a metal ring 111 which is printed on a thick film circuit board 112 and receives a flange 113 of a generally cylindrical housing 114, flange 113 being soldered to printed metal ring 111. A rubber gasket 15 is positioned in the upper opening of cylindrical housing 114 and a tube 16 is positioned in the center of gasket 15. Tube 16 is typically a polymer, and gasket 15 is typically a nitride rubber material. Housing 114 can be tin plated steel.

Manufacturing processes to fabricate such a structure typically include solder reflow and cleaning bath immersion. These processes reduce the adhesion of printed metal ring 111 to thick film circuit board 112. This is undesirable since reducing the adhesion may cause a pressure leak between ring 111 and thick film circuit board 112 and thereby cause sensor failure or reduce sensor accuracy. The adhesion is reduced because of heat retained in tin plated steel housing 114 for an extended period of time during solder reflow and during cleaning bath immersion operations.

It would be desirable to have a relatively simple and quickly assembled housing which provides a reliable pressure seal and easy assembly. These are some of the problems this invention overcomes.

SUMMARY OF THE INVENTION

Improved manufacturability is achieved by having a housing which can support the various components of a thick film circuit assembly during fabrication, and by reducing the number of parts in the assembly.

A housing structure for use with a thick film circuit board includes a housing for enclosing a pressure sensor on the thick film circuit board and an intermediate rubber ring between the housing and the thick film circuit to provide a pressure seal. A coupling means applies a force between the housing and the thick film circuit to draw the two together and apply a sealing force to the rubber. For example, the coupling means can be a screw connector applying a force between a base plate below the thick film and a connector shell above said thick film.

BRIEF DESCRIPTION OF THE DRAWINGS

FIG. 7 is a section view along section 7—7 of FIG. 4;

FIG. 8 is a section view along section 8—8 of FIG. 4;

FIG. 9 is a section view along line 9—9 of FIG. 8;

FIG. 10 is a view along section 10—10 of FIG. 4; and

DETAILED DESCRIPTION OF THE INVENTION

Figure 3:
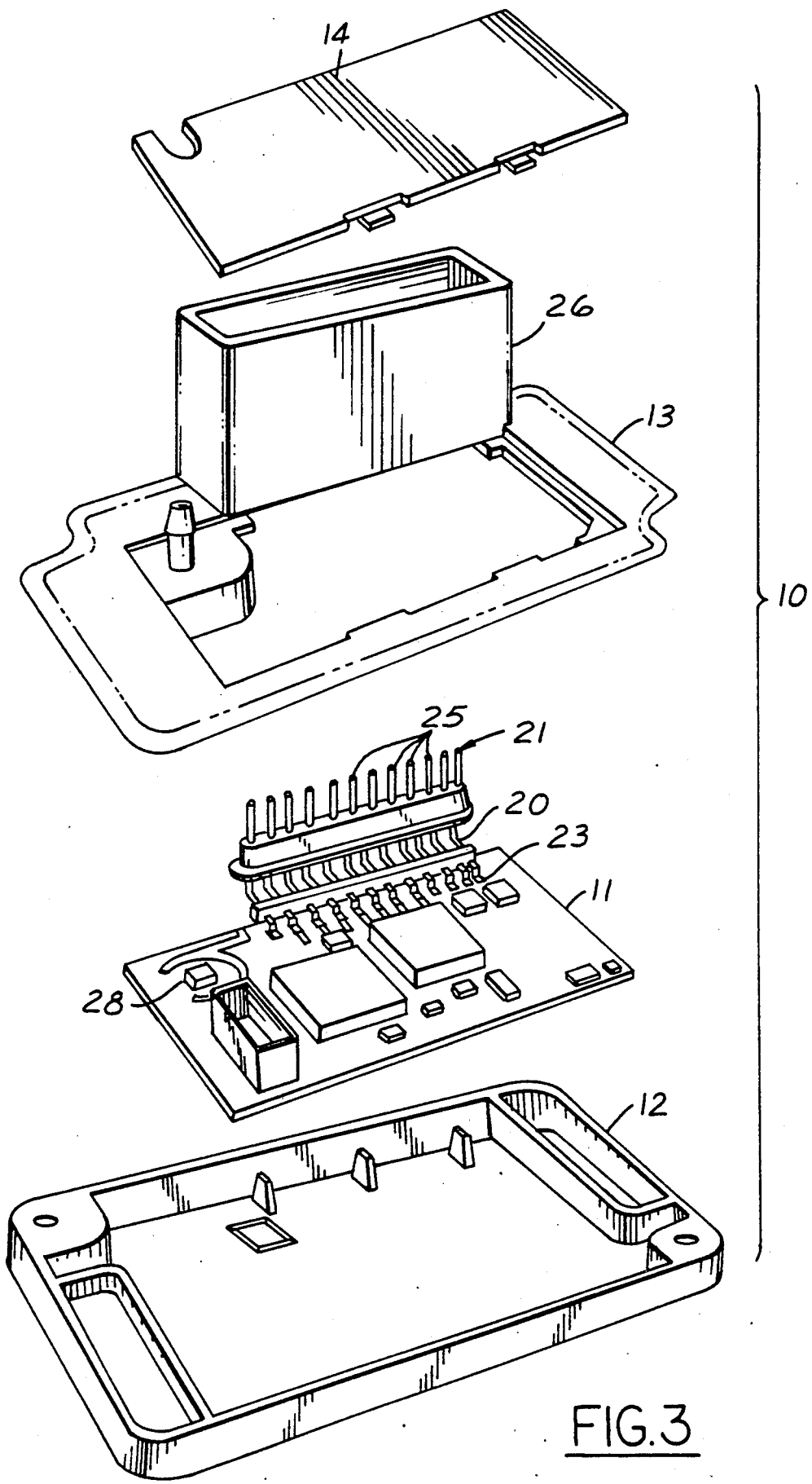
FIG. 3 is an exploded perspective view of a thick film circuit assembly in accordance with an embodiment of this invention.
Figure 4:
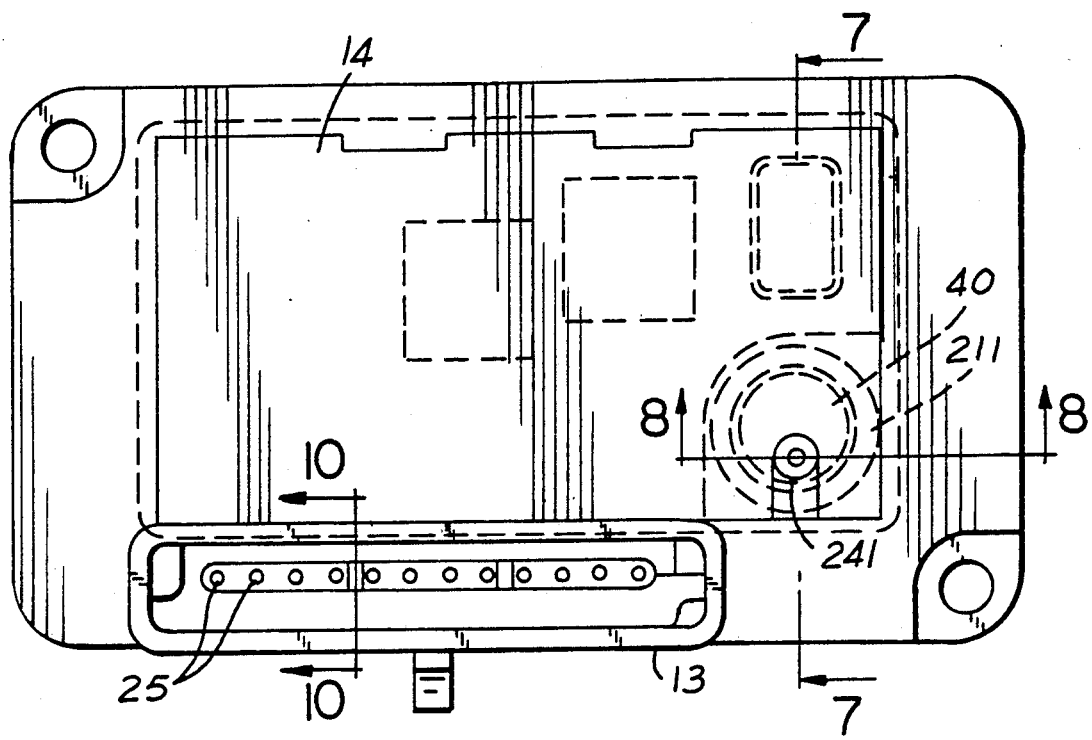
FIG. 4 is a plan view of a thick film circuit assembly in accordance with an embodiment of this invention.
Figure 5:
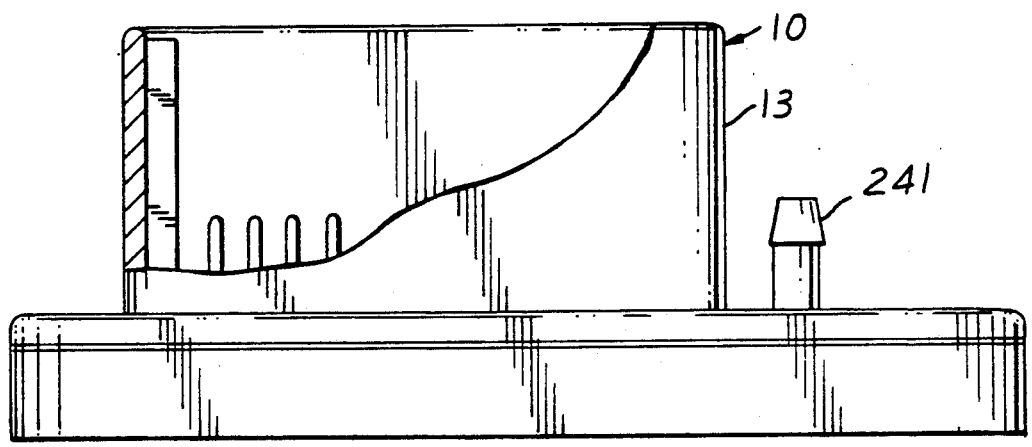
FIG. 5 is a side view, partly broken away, of the assembly of FIG. 4.

Referring to FIG. 3, a thick film circuit assembly 10 includes a thick film circuit board 11 which is positioned in a bottom housing 12 and covered by a top housing 13 with an access panel 14. A terminal 21 has a plurality of electrical connectors 25 with associated legs 20 and angled feet 23, and is coupled to thick film circuit board 11 at angled feet 23. A pressure sensor 28 and various other components are coupled to a circuit board 11.

Figure 1:
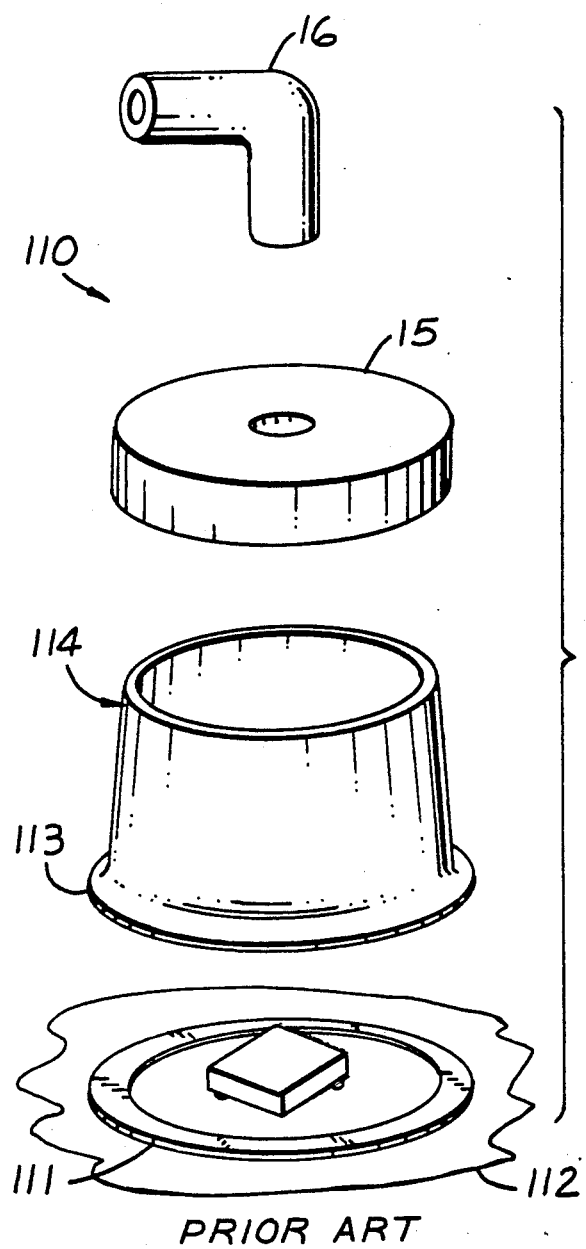
FIG. 1 is a exploded perspective view of a housing in accordance with the prior art.
Figure 2:
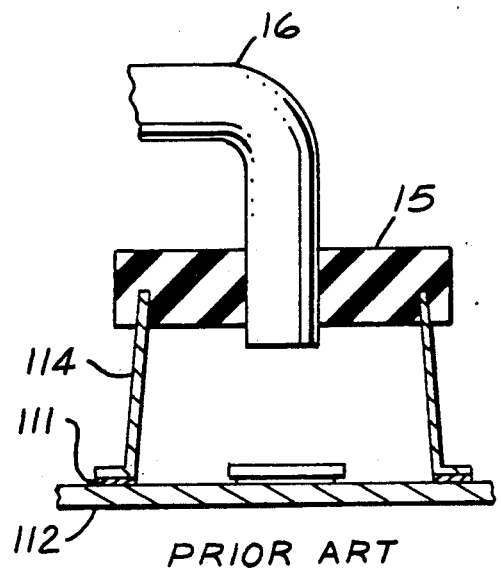
FIG. 2 is a section view of the assembled housing of FIG. 1 in accordance with the Prior art.
Figure 11:
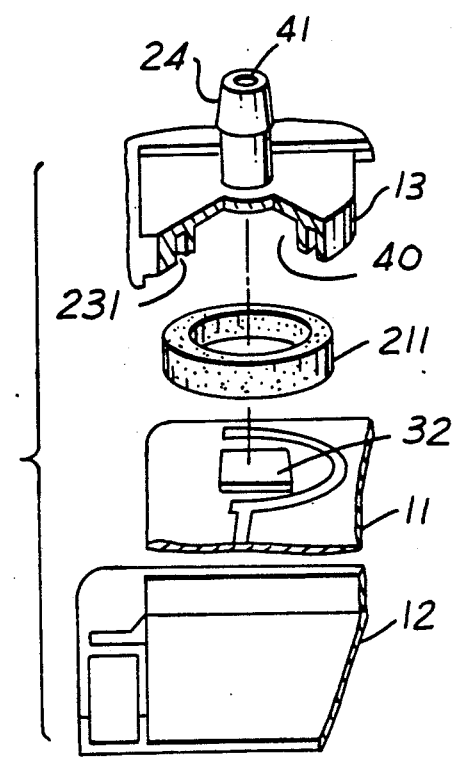
FIG. 11 is an exploded perspective view of a pressure housing assembly in accordance with an embodiment of this invention.

Referring to FIGS. 4 through 9, and particularly FIG. 8, thick film circuit assembly 10 includes a rubber ring 221 which is coupled between thick film circuit board 11 and top housing 13. Advantageously, top housing 13 is a one piece structure with a cavity 40 surrounded by a circular recess 231 for receiving a portion of rubber ring 211. Cavity 40 is coupled to an elongated inlet opening 41. The top portion of top housing 13 about inlet opening 41 is a nozzle 241 which can be coupled to a tube. A pressure sensor 32 is positioned on thick film circuit board 11 within cavity 40. FIG. 11 shows an exploded view of the housing assembly for Pressure sensor 32.

Figure 6:
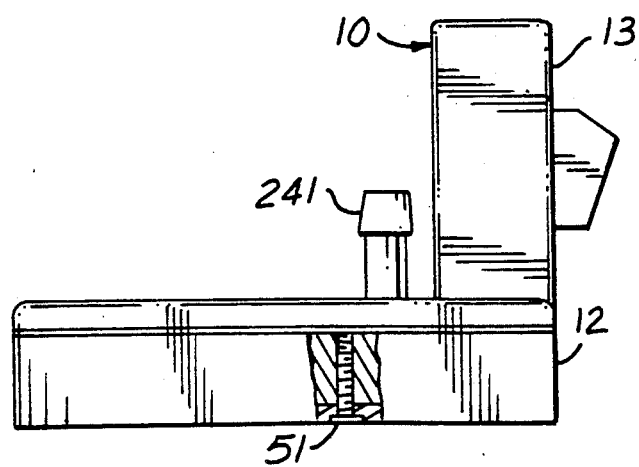
FIG. 6 is another side view of the assembly of FIG. 4, partly broken away, to show a connecting force application screw.

To assemble thick film circuit assembly 10, a force is applied between thick film circuit board 11 and top housing 13 to compress and seal rubber ring 211. A typical way of applying such a force is to position thick film circuit board 11 on a base plate or bottom housing 12 and then to couple a force between bottom housing 12 and top housing 13. For example, a coupling force can be applied by a screw 51 as shown in FIG. 6. Accordingly, an enclosure for pressure sensor 32 is provided by a relatively simple structure which both provides the housing and the pressure seal required for the operation of pressure sensor 32.

FIG. 10 shows how an elongated guide bar 30, connecting all the legs 20 of terminal 21, helps to position terminal 21 within a terminal support 26 of top housing 13. Guide bar 30 has tapered sides 31 which are received by a tapering opening 132 of terminal support 26. As a result, electrical connectors 25 are accurately centered within an opening 33 (in communication with opening 132) in terminal support 26. This self-centering effect provides for correct alignment of terminal 21 and improved ease of coupling another electrical connector to terminal 21.

The structure of the components of thick film circuit assembly 10 facilitates rapid and accurate assembly. During assembly, top housing 13 is positioned so that cavity 40 faces upward. Rubber ring 211 is dropped into circular recess 231. Thick film circuit board 11 is then dropped into top housing 13 so that pressure sensor 32 enters cavity 40 and terminal 21 enters terminal support 26. Top housing 13 has a recessed edge to receive and align thick film board 11. As terminal 21 enters terminal support 26, the tapered sides of guide bar 30 engage tapering opening 32 of terminal support 26 and align terminal 21. Bottom housing 12 is then positioned on the combination of top housing 13 and thick film board 11. Screw 51 is inserted to couple bottom housing 12 to top housing 13 thereby securing thick film circuit assembly 10 and establishing a pressure seal at rubber ring 211.

Various modifications and variations will no doubt occur to those skilled in the art to which this invention pertains. For example, the particular shape of the housing and relative component sizes may be varied from that disclosed herein. These and all other such variations which basically rely on the teachings through which this disclosure has advanced the art are properly considered in the scope of this invention.

I claim:

1. A method of fabricating a thick film integrated circuit assembly with a circuit board, a pressure sensor, and an electrical terminal including the steps of:
   forming a housing with a cavity for receiving the pressure sensor;
   positioning a sealing ring around the pressure sensor on the thick film circuit board;
   positioning the housing on the thick film circuit board so the sealing ring is adjacent the periphery of the cavity;
   positioning the housing on the thick film circuit board so the sealing ring is adjacent the periphery of the cavity;
   positioning a base plate adjacent the side of the thick film circuit board opposite from the housing; and
   applying a coupling force between the base plate and the housing so that the housing presses on the sealing ring and forms a pressure seal between the housing and the thick film circuit board.

2. A method of fabricating a thick film integrated circuit assembly as recited in claim 1 further comprising the steps of:
   forming a tapered terminal guide opening in the housing;
   forming a tapered guide bar coupled to the electrical terminal, the tapered guide bar and the guide opening cooperating so as to provide a self-centering force; and
   wherein the step of positioning the housing and applying a coupling force includes guiding the tapered guide bar into the tapered terminal guide opening so as to provide a self-centering action for the terminal with respect to the housing.

3. A method of fabricating a thick film integrated circuit assembly as recited in claim 2 wherein said step of applying a coupling force includes screwing the base plate and the housing together.

4. A method of fabricating a thick film integrated circuit having a thick film circuit board and a self-centering terminal including the steps of:
   forming a terminal row having a plurality of parallel legs each having an angled foot portion for connection to said thick film circuit board;
   forming a longitudinal tie bar extending perpendicular to the legs and connecting the legs to each other for stabilization;
   connecting the terminal to said thick film circuit board at the same time other components are connected to the thick film circuit board;
   forming a self-centering terminal by forming a tapered base around the base of said terminal, said base tapering towards said terminal termination;
   forming a tapering receiving opening in a connector shell around said thick film integrated circuit for receiving said tapered base of said terminal; and
   forming a pressure cavity in the connector shell for providing pressure isolation around a portion of the surface of the thick film integrated circuit.

5. A method of fabricating a thick film integrated circuit assembly with a thick film circuit board, a pressure sensor and a terminal including the steps of:
   forming a housing with a first cavity for receiving the pressure sensor and a second cavity with tapered sides for receiving the terminal;
   positioning the housing adjacent a first side of the circuit board;
   positioning a guide bar with tapered sides around the terminal for cooperating with the second cavity to position the terminal with respect to the housing;
   positioning a sealing ring around the pressure sensor on the thick film circuit, so as to surround the opening of the first cavity;
   positioning a base plate adjacent the second side of the circuit board; and
   applying a coupling force between the base plate and the housing so that the housing presses on the sealing ring and forms a pressure seal between the housing and the thick film circuit board.

6. A method of fabricating a thick film integrated circuit assembly as recited in claim 5 further including the steps of:
   fitting the thick film circuit to the housing so that the thick film circuit is supported by the housing; and
   supporting the base plate by the combination of the housing and the thick film circuit.

* * * * *